United States Patent
Yang et al.

(10) Patent No.: US 9,231,679 B1
(45) Date of Patent: Jan. 5, 2016

(54) MULTIPLE INPUT MULTIPLE OUTPUT WIRELESS COMMUNICATION SYSTEM AND CHANNEL DECOMPOSITION METHOD THEREOF

(71) Applicant: Winbond Electronics Corp., Taichung (TW)

(72) Inventors: Chia-Hsiang Yang, Kinmen County (TW); Yu-Cheng Tsai, Tainan (TW)

(73) Assignee: Winbond Electronics Corp., Taichung (TW)

( * ) Notice: Subject to any disclaimer, the term of this patent is extended or adjusted under 35 U.S.C. 154(b) by 0 days.

(21) Appl. No.: 14/698,855

(22) Filed: Apr. 29, 2015

(30) Foreign Application Priority Data

Jan. 8, 2015 (TW) .............................. 104100520 A

(51) Int. Cl.
*H04B 7/02* (2006.01)
*H04B 7/04* (2006.01)
*H04L 25/02* (2006.01)

(52) U.S. Cl.
CPC .......... *H04B 7/0456* (2013.01); *H04L 25/0204* (2013.01)

(58) Field of Classification Search
CPC ..... H04L 1/0618; H04L 1/06; H04L 25/0204; H04L 27/2647; H04L 5/0007; H04L 27/2657; H04L 27/2662; H04L 5/0048; H04L 25/4902; H04L 1/0009; H04L 1/0041; H04L 25/49; H04B 7/0417; H04B 7/0669; H04B 3/54
USPC ................. 375/267, 260, 259, 316, 295, 219
See application file for complete search history.

(56) References Cited

U.S. PATENT DOCUMENTS

| | | | |
|---|---|---|---|
| 7,616,695 B1 * | 11/2009 | Sarrigeorgidis | H04L 25/0204 375/260 |
| 8,199,841 B1 | 6/2012 | Sarrigeorgidis et al. | |
| 8,213,540 B1 | 7/2012 | Lee et al. | |
| 8,737,540 B1 | 5/2014 | Shi et al. | |
| 2009/0143017 A1 * | 6/2009 | Barak | H04B 7/0413 455/65 |

OTHER PUBLICATIONS

Mahdi Shabany, et al., "A 0.13μm CMOS 655Mb/s 4×4 64-QAM K-Best MIMO Detector," IIEEE International Solid-State Circuits Conference (ISSCC). Digital Wireless and Reconfigurability, Feb. 2009, pp. 256-pp. 257.

(Continued)

*Primary Examiner* — Zewdu Kassa
(74) *Attorney, Agent, or Firm* — Jiang Chyun IP Office

(57) ABSTRACT

A multiple input multiple output wireless communication system and a channel decomposition method thereof are provided. The wireless communication system includes a precoding unit, a channel estimation unit, a channel decomposition unit and a quantization unit. The precoding unit receives a plurality of transmission data streams and wireless channel information to provide a plurality of transmission symbols to a wireless channel. The channel estimation unit estimates the wireless channel to provide a channel matrix. The channel decomposition unit makes a plurality of elements on a diagonal and adjacent to a side of the diagonal as real numbered elements through an element ration and correspondingly rotates a first unit matrix and a second unit matrix to obtain channel state information. The quantization unit provides the wireless channel information according to the channel state information.

12 Claims, 13 Drawing Sheets

(56) References Cited

OTHER PUBLICATIONS

Mahdi Shabany, et al., "A 675 Mbps, 4×4 64-QAM K-Best MIMO Detector in 0.13μm CMOS," IEEE Transactions on Very Large Scale Intergration (VLSI) Systems, vol. 20, No. 1, Jan. 2012, pp. 135-pp. 147.

Zheng-Yu Huang, et al., "High-Throughput QR Decomposition for MIMO Detection in OFDM Systems," Proceedings of 2010 IEEE International Symposium on Circuits and Systems (ISCAS), May 30, 2010-Jun. 2, 2010, pp. 1492-pp. 1495.

Wei-Da Chen, et al., "A Constant Throughput Geometric Mean Decomposition Scheme Design for Wireless MIMO Precoding," IEEE Transactions on Vehicular Technology, vol. 62, No. 5, Jun. 2013, pp. 2080-pp. 2090.

* cited by examiner

MULTIPLE INPUT MULTIPLE OUTPUT WIRELESS COMMUNICATION SYSTEM AND CHANNEL DECOMPOSITION METHOD THEREOF

CROSS-REFERENCE TO RELATED APPLICATION

This application claims the priority benefit of Taiwan application serial no. 104100520, filed on Jan. 8, 2015. The entirety of the above-mentioned patent application is hereby incorporated by reference herein and made a part of this specification.

BACKGROUND

1. Technical Field

The invention relates to a wireless communication system, and particularly relates to a multiple input multiple output wireless communication system and a channel decomposition method thereof.

2. Related Art

Configuration of a wireless communication system can be single input single output (SISO) or multiple input multiple output (MIMO), where the MIMO system may apply a spatial multiplexing (SM) technique, such that the MIMO system can send different signals through different antenna sets, i.e., the MIMO system can generally provide a higher throughput.

However, when the spatial multiplexing technique is applied to transmit signals, the simultaneously transmitted signals are attenuated and interfered in a wireless channel, which influences a data transmission rate. Therefore, a precoding technique based on channel state information (CSI) is developed. However, it is a complicate operation to decompose the CSI from a channel matrix of the wireless channel, i.e., complexity of a hardware design of an operator is relatively high. Therefore, how to decrease the complexity for decomposing the channel matrix has become an important issue for developing the MIMO wireless communication system.

SUMMARY

The invention is directed to a multiple input multiple output wireless communication system and a channel decomposition method thereof, by which a memory space and computation complexity required for decomposing a channel matrix are decreased.

The invention provides a multiple input multiple output wireless communication system including a precoding unit, a channel estimation unit, a channel decomposition unit and a quantization unit. The precoding unit receives a plurality of transmission data streams and quantized wireless channel information to provide a plurality of transmission symbols to a wireless channel. The channel estimation unit estimates the wireless channel to provide a channel matrix. The channel decomposition unit decomposes the channel matrix to provide channel state information. The channel decomposition unit divides the channel matrix along a diagonal to form a first portion including the diagonal and a second portion not including the diagonal, and rotates a plurality of first complex elements in the first portion through an element rotation to make the first complex elements on the diagonal to be real numbered elements and values of the other first complex elements to be zero, and rotates a first unit matrix column-by-column according to a plurality of first rotation angles obtained through the element rotation of the first complex elements, and rotates a plurality of second complex elements in the second portion through the element rotation to make the second complex elements adjacent to the diagonal to be a plurality of real numbered elements and values of the other second complex elements to be zero, and rotates a second unit matrix row-by-row according to a plurality of second rotation angles obtained through the element rotation of the second complex elements to obtain the channel state information. The quantization unit provides the wireless channel information according to the cannel state information.

The invention provides a channel decomposition method of a multiple input multiple output wireless communication system, which includes following steps. Estimating a wireless channel to provide a channel matrix by a channel estimation unit. Decomposing the channel matrix to provide channel state information by a channel decomposition unit, which includes following steps. Dividing the channel matrix along a diagonal to form a first portion including the diagonal and a second portion not including the diagonal by the channel decomposition unit. Rotating a plurality of first complex elements in the first portion through an element rotation by the channel decomposition unit to make the first complex elements on the diagonal to be real numbered elements and values of other first complex elements to be zero. Rotating a first unit matrix column-by-column according to a plurality of first rotation angles obtained through the element rotation of the first complex elements by the channel decomposition unit. Rotating a plurality of second complex elements in the second portion through the element rotation by the channel decomposition unit to make the second complex elements adjacent to the diagonal to be a plurality of real numbered elements and values of the other second complex elements to be zero, and rotating a second unit matrix row-by-row according to a plurality of second rotation angles obtained through the element rotation of the second complex elements by the channel decomposition unit to obtain the channel state information. Providing a wireless channel information according to the channel state information by a quantization unit. Providing a plurality of transmission symbols to the wireless channel according to a plurality of transmission data streams and the wireless channel information by a precoding unit.

According to the above descriptions, in the multiple input multiple output wireless communication system and the channel decomposition method thereof of the invention, the channel matrix is directly decomposed into three matrices through the element rotation, and matrix sizes of the three matrices are the same to that of the channel matrix. In this way, a memory space and the computation complexity required for decomposing the channel matrix are decreased.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
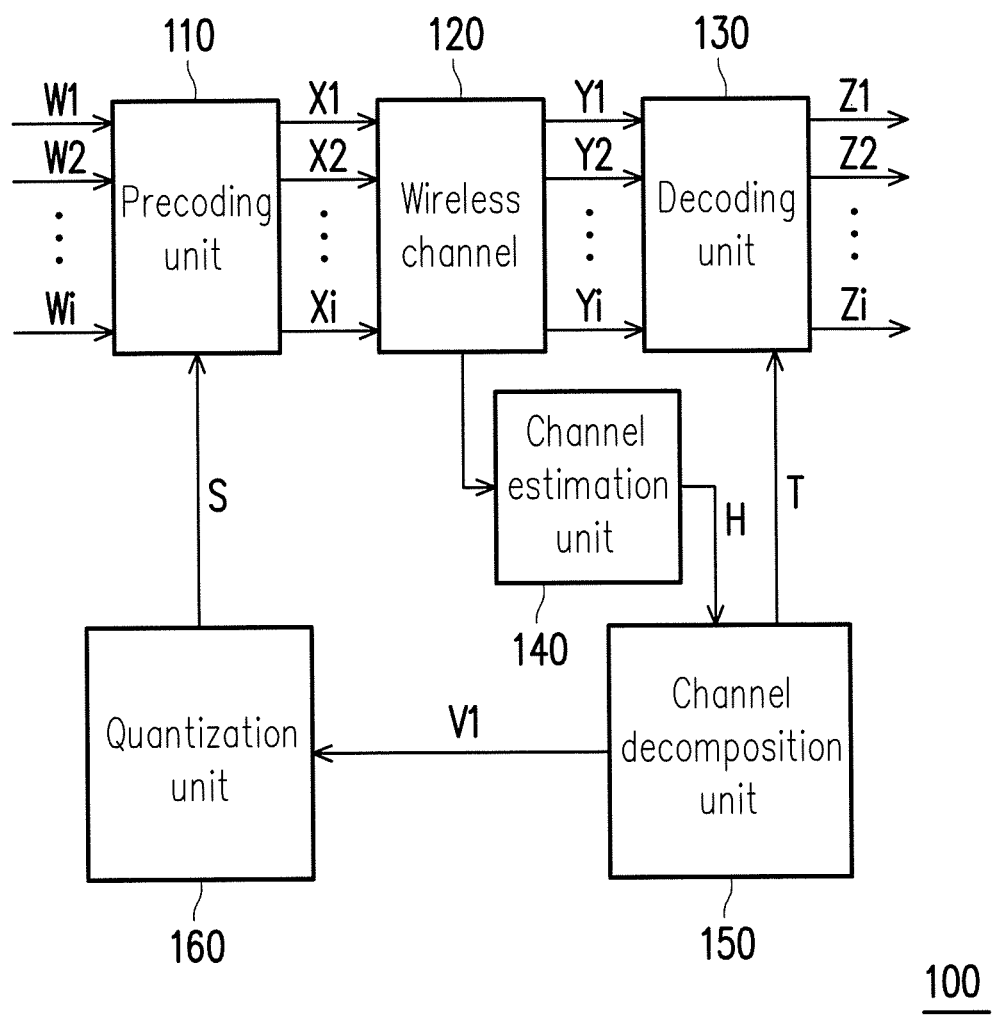
FIG. 1 is a system schematic diagram of a multiple input multiple output (MIMO) wireless communication system according to an embodiment of the invention.

FIG. 1 is a system schematic diagram of a multiple input multiple output (MIMO) wireless communication system according to an embodiment of the invention. Referring to FIG. 1, in the present embodiment, the wireless communication system 100 includes a precoding unit 110, a wireless channel 120, a decoding unit 130, a channel estimation unit 140, a channel decomposition unit 150 and a quantization unit 160. The precoding unit 110 receives a plurality of transmission data streams (for example, W1-Wi, where i is a positive integer) and a quantized wireless channel information matrix S to provide a plurality of transmission symbols (for example, X1-Xi) to the wireless channel 120, where a transmission symbol X (i.e., a set of the transmission symbols X1-Xi) can be defined as X=S·W, and W is, for example, a set of the transmission data streams W1-Wi.

When the transmission symbols X1-Xi are transmitted in the wireless channel 120, the transmission symbols X1-Xi are interfered by noises and attenuated in line with a corresponding transmission distance to form receiving symbols Y1-Yi, where a receiving symbol Y (i.e., a set of the receiving symbols Y1-Yi) can be defined as Y=HX+n, where H is a channel matrix, n is an additive white Gaussian noise (AWGN). The decoding unit 130 receives the receiving symbols Y1-Yi, and decodes the receiving symbols Y1-Yi according to a decoding reference matrix T to output receiving data streams Z1-Zi, where a receiving data stream vector Z (i.e., a set of the receiving data streams Z1-Zi) can be defined as Z=T·Y, and Y is, for example, the set of the receiving symbols Y1-Yi.

The channel estimation unit 140 estimates the wireless channel 120 for providing the channel matrix H. The channel decomposition unit 150 decomposes the channel matrix H to provide channel state information V1 and the decoding reference matrix T. The quantization unit 160 provides the wireless channel information matrix S according to the cannel state information V1.

In the present embodiment, the channel decomposition unit 150 decomposes the channel matrix H into three multiplying matrices Q, R, P through an element rotation, where the matrices Q, P are complex unitary matrices, and in the matrix R, elements on the diagonal and elements adjacent to one side of the diagonal are real numbered elements, and values of the other elements are zero. Moreover, matrix sizes of the matrices Q, R, P are the same, and the aforementioned element rotation is, for example, Givens rotation, and the element rotation can be executed through a coordinate rotation digital computer (CORDIC), and the CORDIC may include adders, subtracters and shifters, and rotation angles are, for example, calculated by the CORDIC.

Figure 2A:
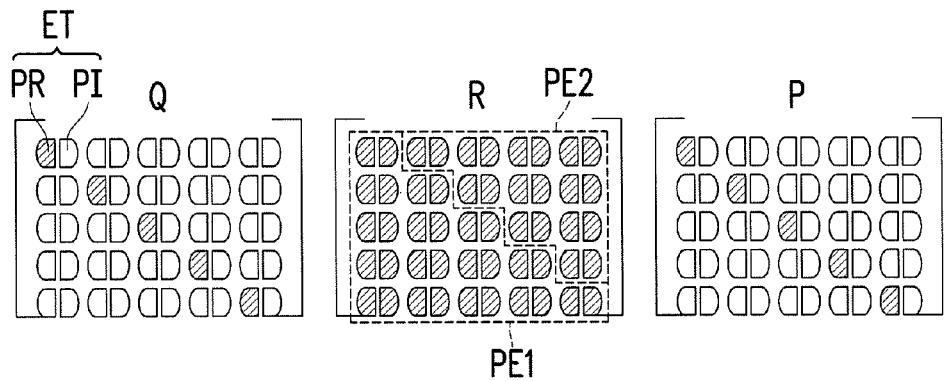
FIG. 2A to FIG. 2Q are schematic diagrams of channel matrix decomposition according to an embodiment of the invention.
Figure 2B:
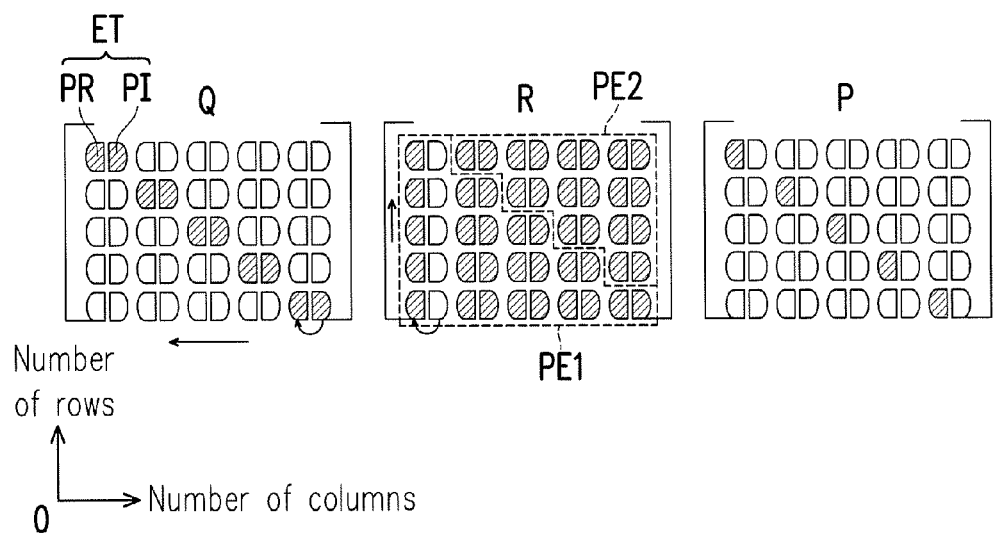
Figure 2C:
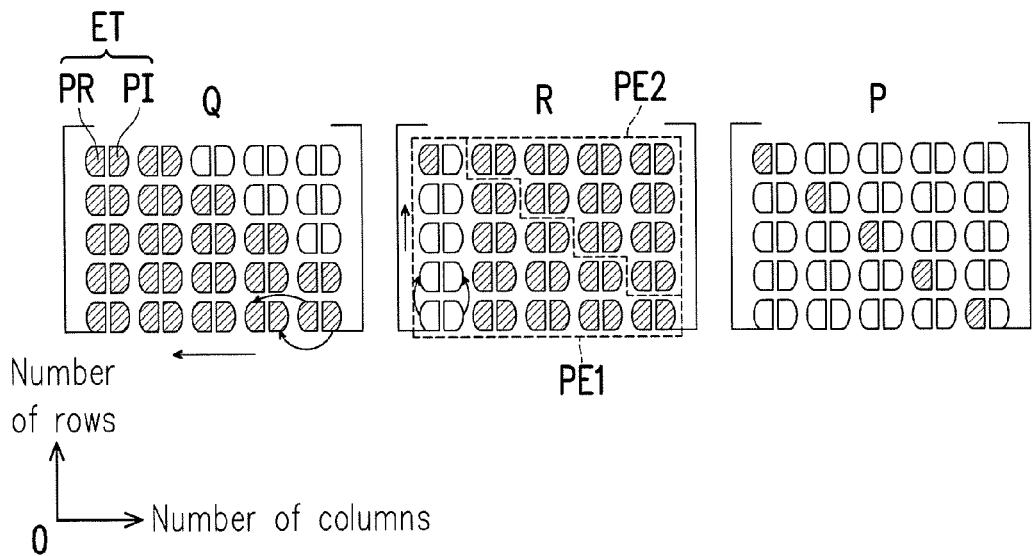
Figure 2D:
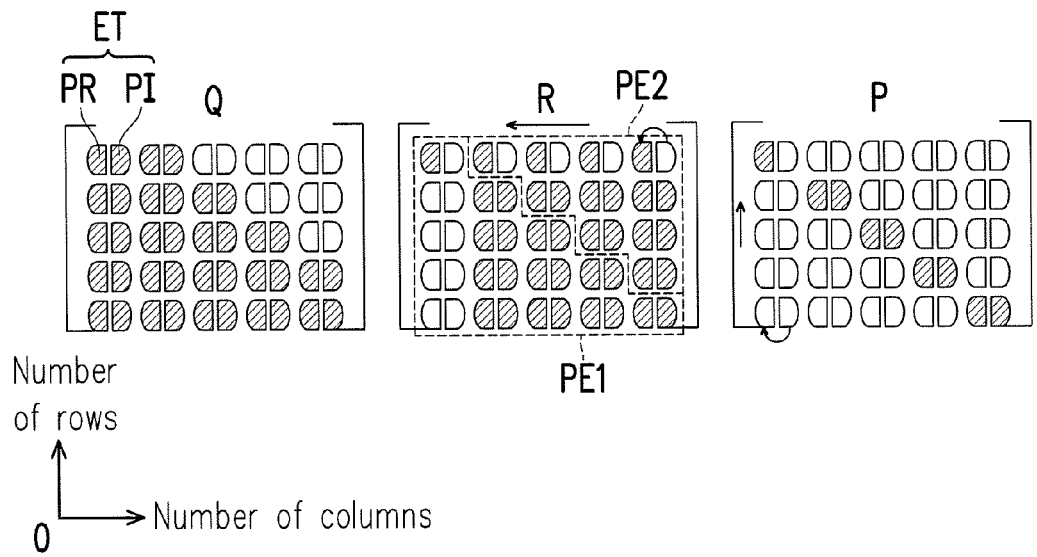
Figure 2E:
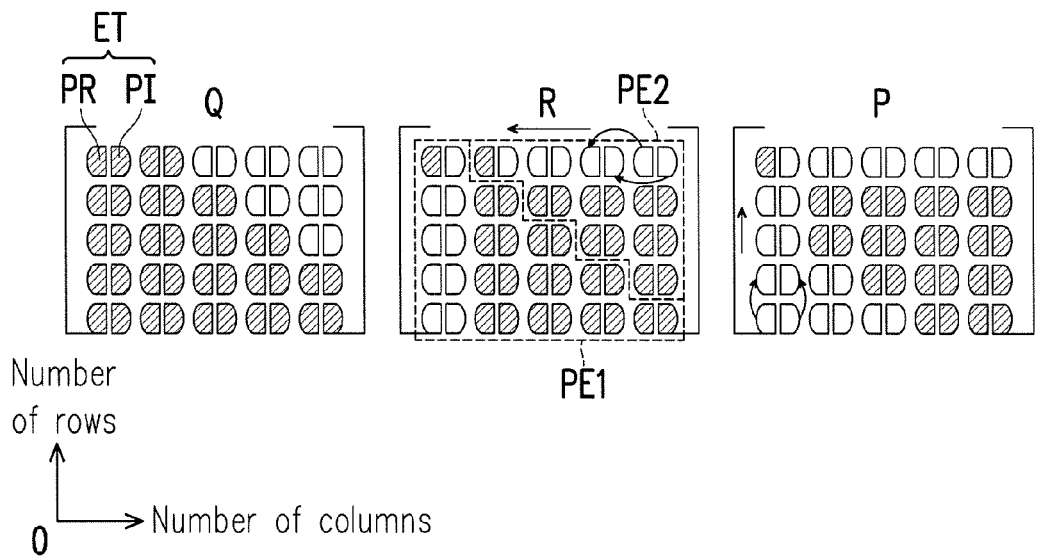
Figure 2F:
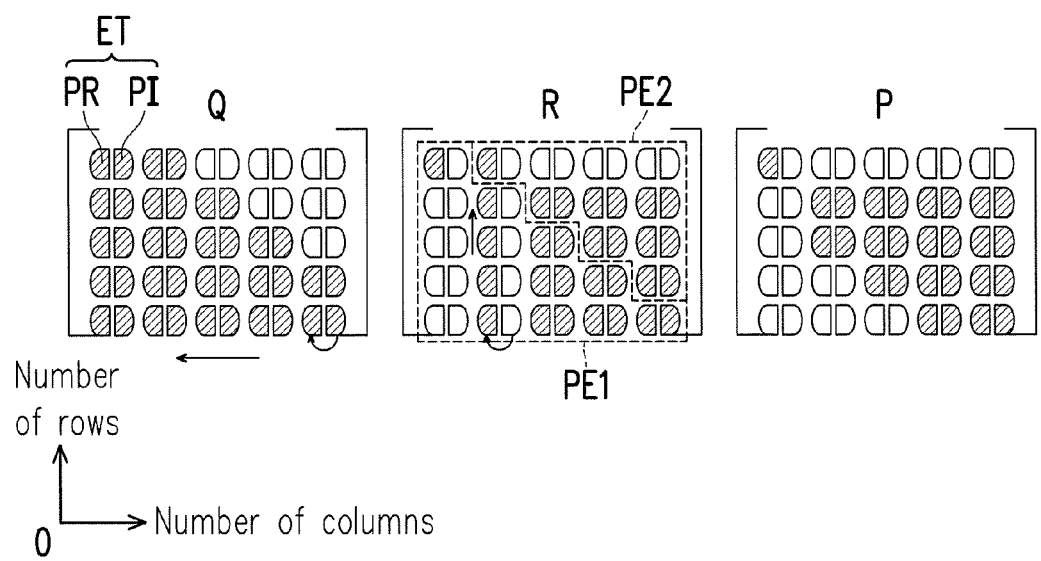
Figure 2G:
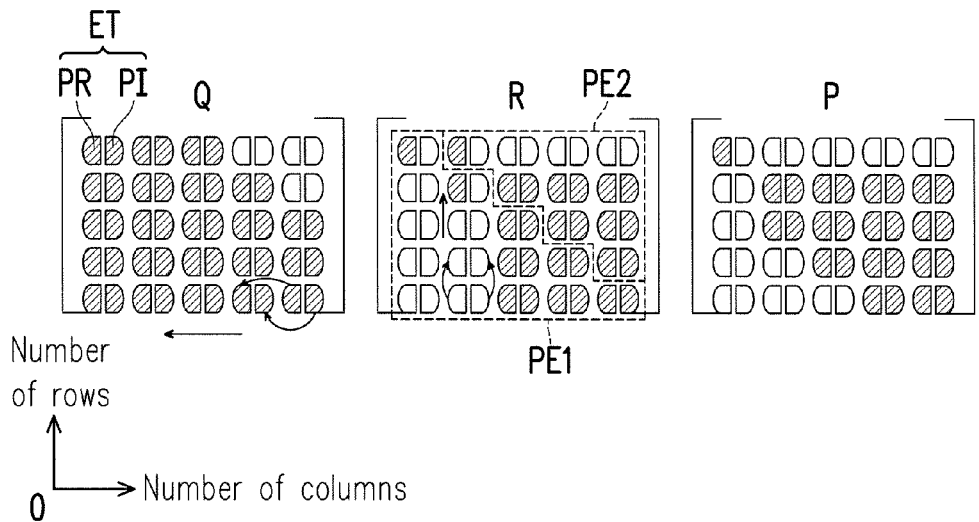
Figure 2H:
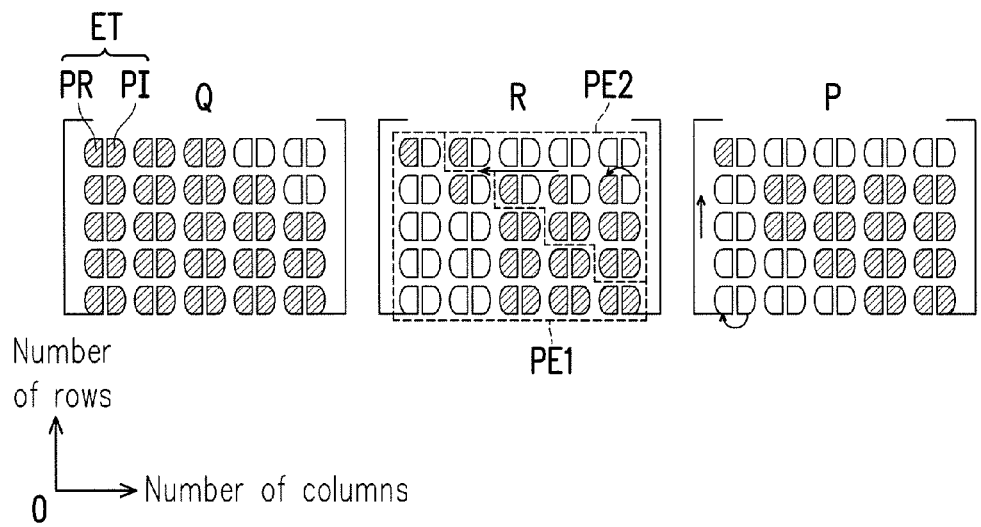
Figure 2I:
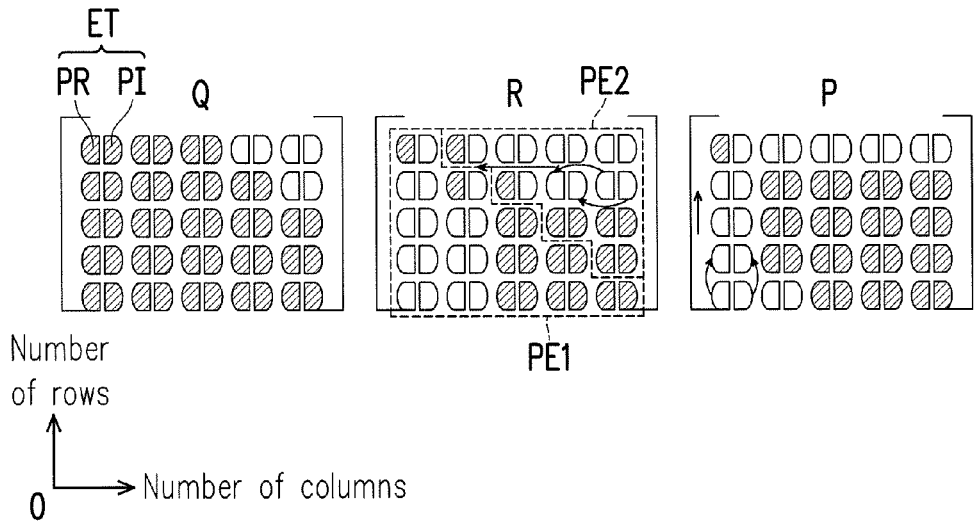
Figure 2J:
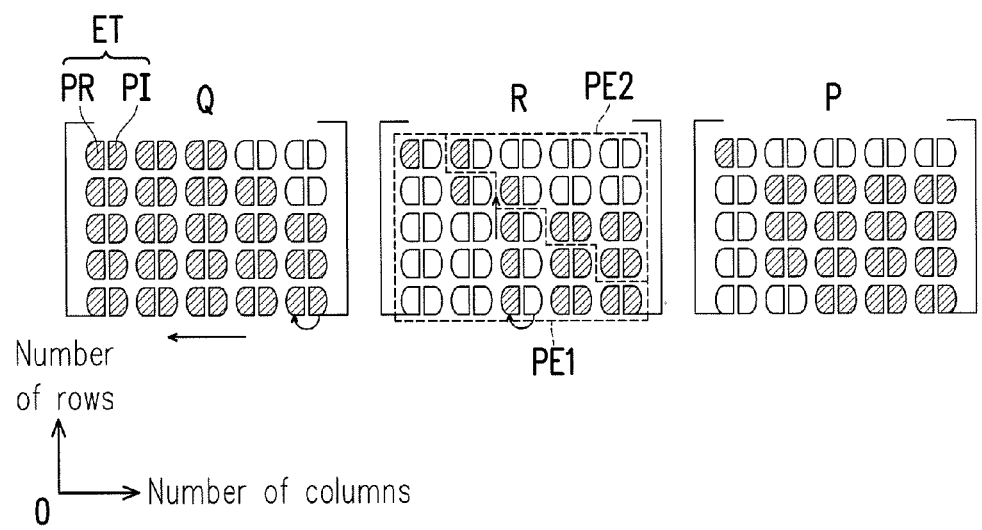
Figure 2K:
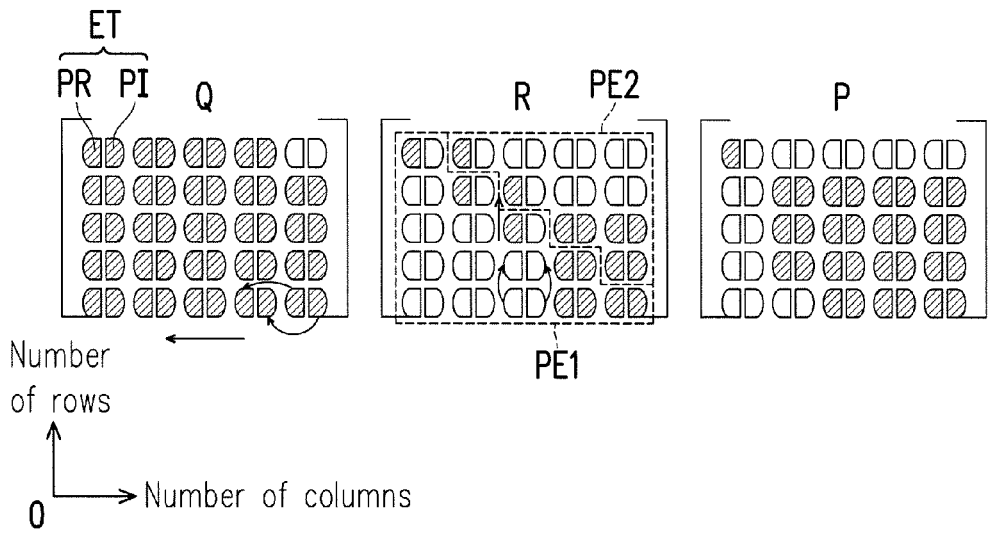
Figure 2L:
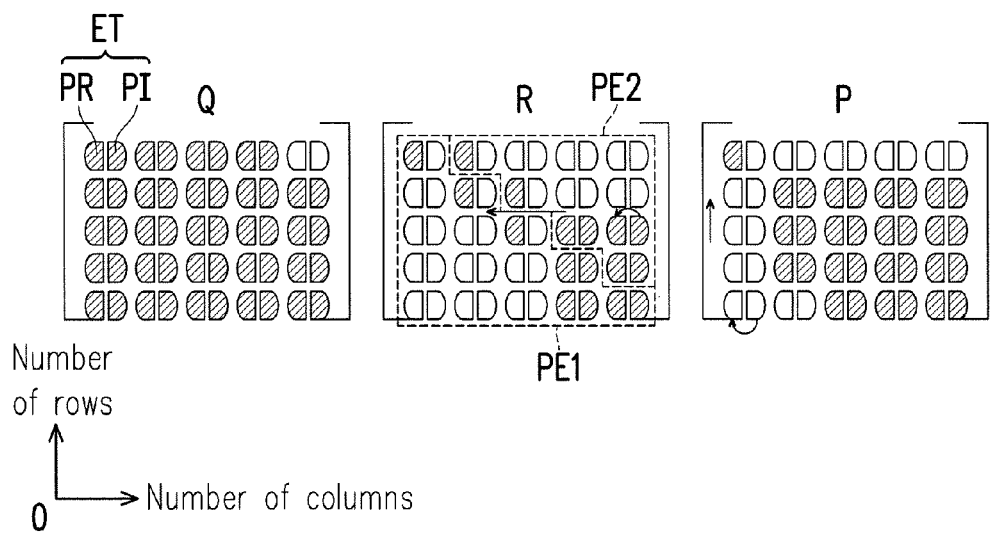
Figure 2M:
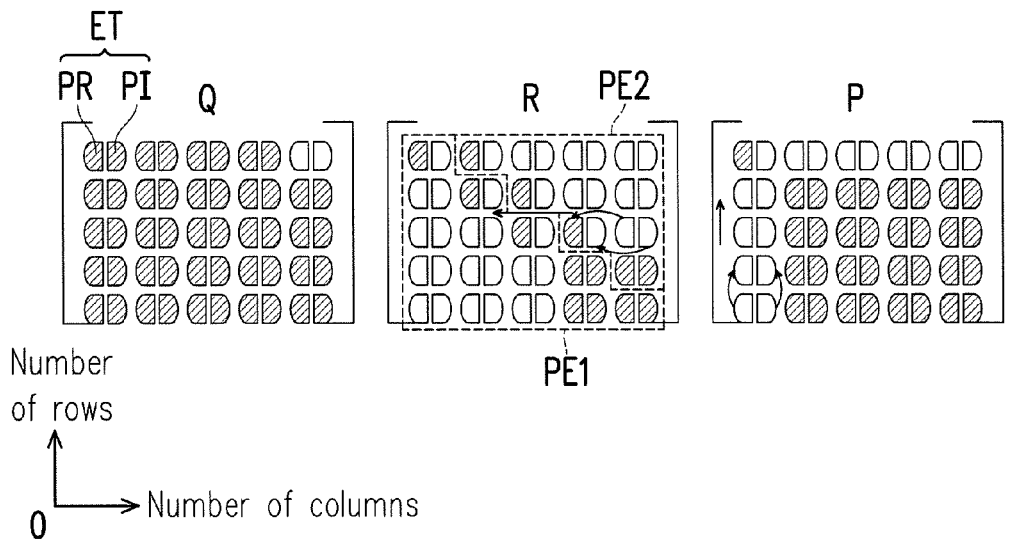
Figure 2N:
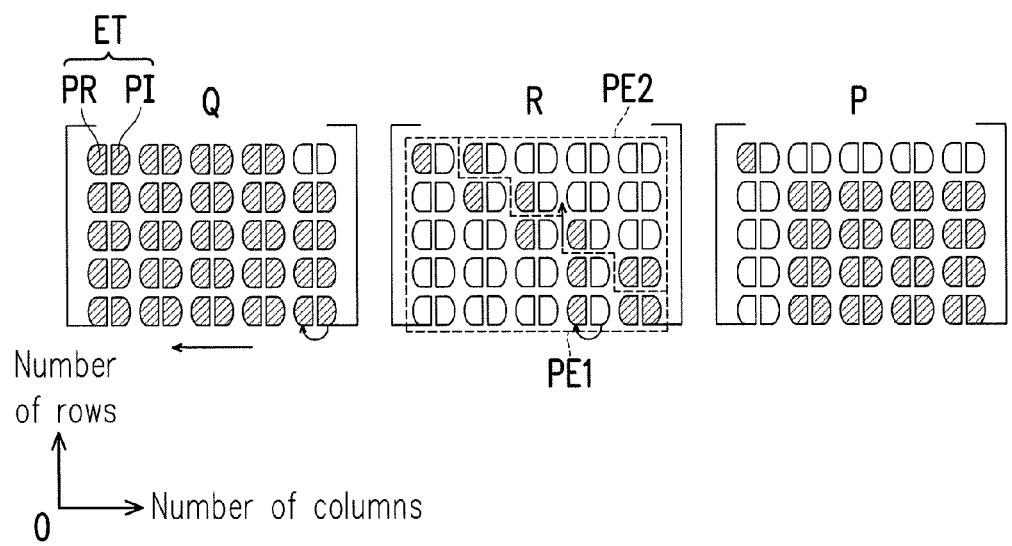
Figure 2O:
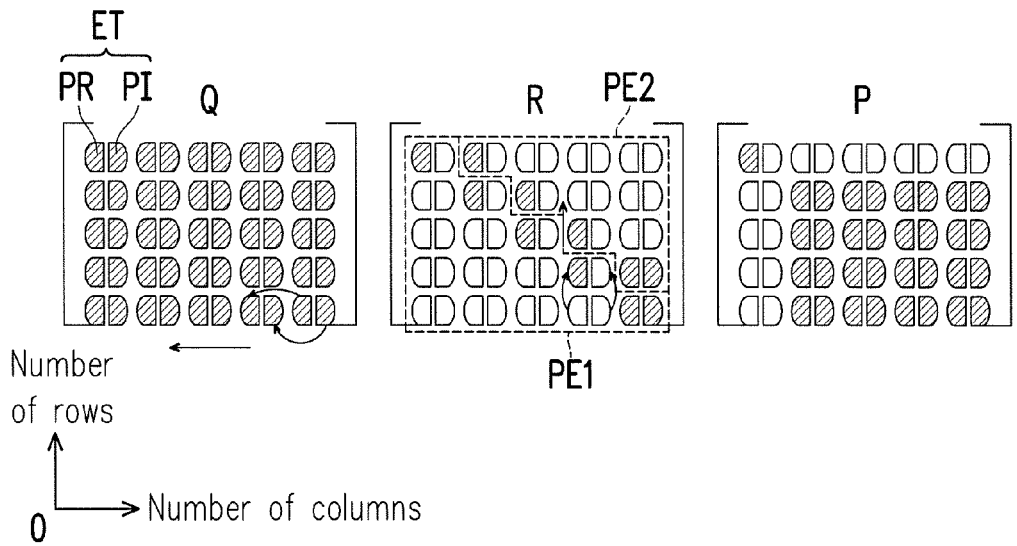
Figure 2P:
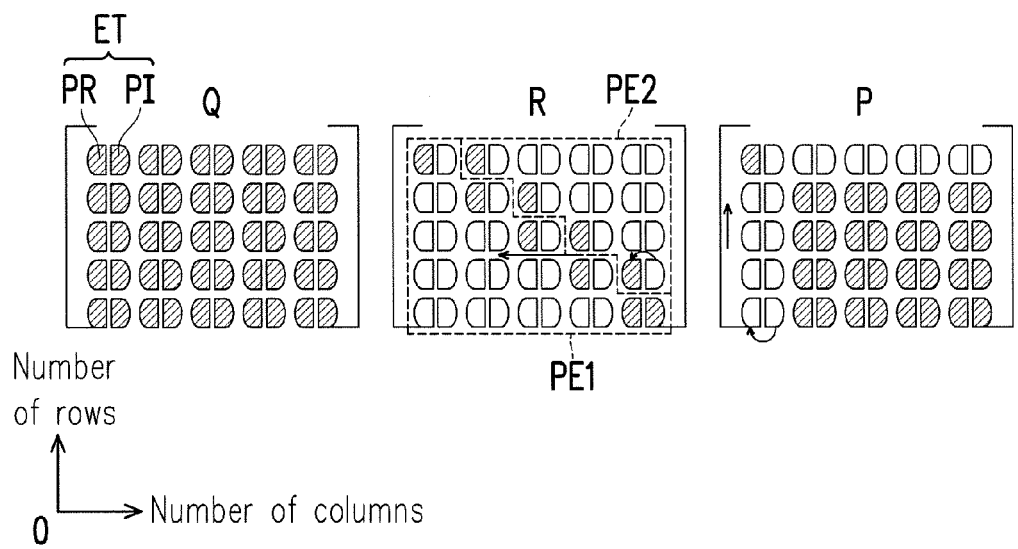
Figure 2Q:
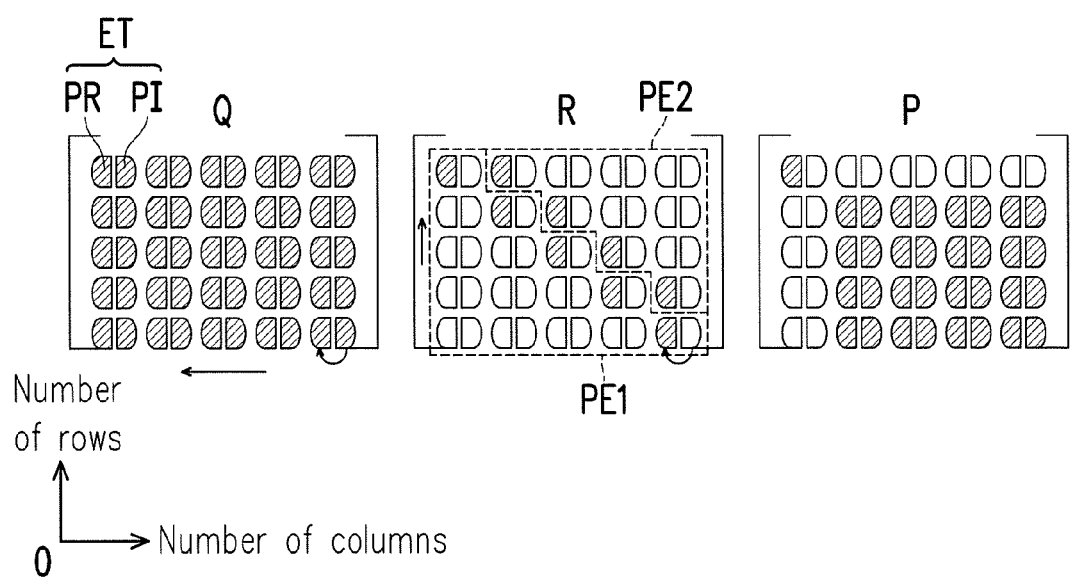

FIG. 2A to FIG. 2Q are schematic diagrams of channel matrix decomposition according to an embodiment of the invention. Referring to FIG. 1 and FIG. 2A to FIG. 2Q, in the present embodiment, the matrices Q, R, P are, for example, 5×5 matrices, through the invention is not limited thereto. The matrices Q, P are first initialized to unit matrices), and the matrix R is initialized to the channel matrix H, where a horizontal axis represents the number of columns, and a vertical axis represents the number of rows. In FIG. 2A, each element ET includes a real part PR and an imaginary part PI, i.e., the element ET is a complex element, and the matrix R is divided along a diagonal to form a first portion PE1 including the diagonal and a second portion PE2 not including the diagonal.

In FIG. 2B, the elements ET of the first column in the matrix R are all converted into real numbered elements (i.e., a value of the imaginary part PI of the element ET is 0) through the element rotation. Further, the element ET of the first column and the first row of the matrix R is indicated as an element R(1,1), and the value of the imaginary part PI is transposed to the real part PR through the element rotation, and a rotation angle dR(1,1) thereof can be calculated through the CORDIC, i.e., the value of the real part PR of the element R(1,1) and the value of the imaginary part PI of the element R(1,1) are input to the CORDIC to obtain the rotation angle dR(1,1). Now, regardless of the first portion PE1 and the second portion PE2, each of the elements ET of the first row of the matrix R is rotated by the rotation angle dR(1,1) from the imaginary part PI thereof towards the real part PR thereof. Moreover, in order to maintain consistency of the matrices, each of the elements ET of the fifth column of the matrix Q is rotated by the rotation angle dR(1,1) from the imaginary part PI thereof towards the real part PR thereof.

Then, in the element R(1,2) of the first column and the second row of the matrix R, the value of the imaginary part PI is transposed to the real part PR through the element rotation, and a rotation angle thereof is dR(1,2). Now, regardless of the first portion PE1 and the second portion PE2, each of the elements ET of the second row of the matrix R is rotated by the rotation angle dR(1,2) from the imaginary part PI thereof towards the real part PR thereof. Moreover, in order to maintain consistency of the matrices, each of the elements ET of the fourth column of the matrix Q is rotated by the rotation angle dR(1,2) from the imaginary part PI thereof towards the real part PR thereof.

Processing of the other elements ET in the first column of the matrix R may refer to the aforementioned description, and the elements ET in the matrices R and Q are respectively rotated by the corresponding rotation angle from the imaginary part PI thereof towards the real part PR thereof, where a processing direction of the elements ET in the matrix R is from bottom to top (taking the direction in the figure as an example), and a processing direction of the elements ET in the matrix Q is from right to left (taking the direction in the figure as an example). The rotation angle of the elements ET in the matrix R is a positive direction (i.e., a positive angle rotation), and the rotation angle of the elements ET in the matrix Q is a negative direction (i.e., a negative angle rotation). In the element ET with the value of the real part PR of 0 and the value of the imaginary part PI of 0, the values are not changed after the element rotation.

In FIG. 2C, the elements ET in the first column of the matrix R except the element R(1,5) are all neutralized (i.e., the value of the real part PR and the value of the imaginary part PI in the elements ET are all 0) through the element rotation. Further, the value of the real part PR of the element R(1,1) of the first column and first row in the matrix R is transposed to the value of the real part of the element R(1,2) through the element rotation, and the rotation angle dxR(1,1) thereof can be calculated through the CORDIC, i.e., the values of the real parts PR of the elements R(1,1) and R(1,2) are input to the CORDIC to obtain the rotation angle dxR(1,1).

Now, regardless of the first portion PE1 and the second portion PE2, all of the elements ET in the first row of the matrix R are rotated by the rotation angle dxR(1,1) from the real part PR thereof towards the real part PR of the upper (i.e., the second row) element ET and from the imaginary part PI thereof towards the imaginary part PI of the upper (i.e., the second row) element ET. Moreover, in order to maintain consistency of the matrices, all of the elements ET in the fifth column of the matrix Q are rotated by the rotation angle dxR(1,1) from the real part PR thereof towards the real part PR of the left (i.e., the fourth column) element ET and from the imaginary part PI thereof towards the imaginary part PI of the left (i.e., the fourth column) element ET.

Then, the value of the real part PR of the element R(1,2) of the first column and second row in the matrix R is transposed to the value of the real part of the element R(1,3) through the element rotation, and the rotation angle thereof is dxR(1,2). Now, regardless of the first portion PE1 and the second portion PE2, all of the elements ET in the second row of the matrix R are rotated by the rotation angle dxR(1,2) from the real part PR thereof towards the real part PR of the upper (i.e., the third row) element ET and from the imaginary part PI thereof towards the imaginary part PI of the upper (i.e., the third row) element ET. Moreover, in order to maintain consistency of the matrices, all of the elements ET in the fourth column of the matrix Q are rotated by the rotation angle dxR(1,2) from the real part PR thereof towards the real part PR of the left (i.e., the third column) element ET and from the imaginary part PI thereof towards the imaginary part PI of the left (i.e., the third column) element ET.

The processing method of the other elements ET in the first column of the matrix R may refer to the above description, and all of the elements ET in the matrix R are rotated by the corresponding rotation angle from the real part PR thereof towards the real part PR of the upper element ET and from the imaginary part PI thereof towards the imaginary part PI of the upper element ET, and all of the elements ET in the matrix Q are rotated by the corresponding rotation angle from the real part PR thereof towards the real part PR of the left element ET and from the imaginary part PI thereof towards the imaginary part PI of the left element ET, where a processing direction of the elements ET in the matrix R is also from bottom to top (taking the direction in the figure as an example), and a processing direction of the elements ET in the matrix Q is also from right to left (taking the direction in the figure as an example). The rotation angle of the elements ET in the matrix R is a positive direction (i.e., a positive angle rotation), and the rotation angle of the elements ET in the matrix Q is the positive direction (i.e., the positive angle rotation). In two adjacent elements ET, when the values of the real parts PR are all 0 and the values of the imaginary parts PI are all 0, the values are not changed after the element rotation.

In FIG. 2D, the elements ET in the fifth row of the second portion PE2 of the matrix R are all converted to real numbered elements (i.e., the value of the imaginary part PI in the element ET is 0) through the element rotation. Further, in the element R(5,5) of the fifth column and fifth row of the second portion PE2, the value of the imaginary part PI thereof is transposed to the real part PR thereof through the element rotation, and a rotation angle thereof is dR(5,5). Now, regardless of the first portion PE1 and the second portion PE2, all of the elements ET of the fifth column of the matrix R are rotated by the rotation angle dR(5,5) from the imaginary part PI thereof towards the real part PR thereof. Moreover, in order to maintain consistency of the matrices, all of the elements ET in a first row of the matrix P are rotated by the rotation angle dR(5,5) from the imaginary part PI thereof towards the real part PR thereof.

Then, in the element R(4,5) of the fourth column and fifth row of the second portion PE2, the value of the imaginary part PI thereof is transposed to the real part PR thereof through the element rotation, and a rotation angle thereof is dR(4,5). Now, regardless of the first portion PE1 and the second portion PE2, all of the elements ET of the fourth column of the matrix R are rotated by the rotation angle dR(4,5) from the imaginary part PI thereof towards the real part PR thereof. Moreover, in order to maintain consistency of the matrices, all of the elements ET in a second row of the matrix P are rotated by the rotation angle dR(4,5) from the imaginary part PI thereof towards the real part PR thereof.

The processing method of the other elements ET in the fifth row of the second portion PE2 may refer to the above description, and all of the elements ET in the matrices R and P are rotated by the corresponding rotation angle from the imaginary part PI thereof towards the real part PR thereof, where a processing direction of the elements ET in the matrix R is from right to left (taking the direction in the figure as an example), and a processing direction of the elements ET in the matrix P is also from bottom to top (taking the direction in the figure as an example). Moreover, the rotation angle of the elements ET in the matrix R is a positive direction (i.e., a positive angle rotation), and the rotation angle of the elements ET in the matrix P is a negative direction (i.e., a negative angle rotation). In the element ET with the value of the real part PR of 0 and the value of the imaginary part PI of 0, the values are not changed after the element rotation.

In FIG. 2E, the elements ET in the fifth row of the second portion PE2 except the element R(2,5) are all neutralized (i.e., the value of the real part PR and the value of the imaginary part PI in the elements ET are all 0) through the element rotation. Further, the value of the real part PR of the element R(5,5) of the fifth column and fifth row in the second portion PE2 is transposed to the value of the real part of the element R(4,5) through the element rotation, and the rotation angle thereof is dxR(5,5). Now, regardless of the first portion PE1 and the second portion PE2, all of the elements ET in the fifth column of the matrix R are rotated by the rotation angle dxR(5,5) from the real part PR thereof towards the real part PR of the left (i.e., the fourth column) element ET and from the imaginary part PI thereof towards the imaginary part PI of the left (i.e., the fourth column) element ET. Moreover, in order to maintain consistency of the matrices, all of the elements ET in the first row of the matrix P are rotated by the rotation angle dxR(5,5) from the real part PR thereof towards the real part PR of the upper (i.e., the second row) element ET and from the imaginary part PI thereof towards the imaginary part PI of the upper (i.e., the second row) element ET.

Then, the value of the real part PR of the element R(4,5) of the fourth column and fifth row in the second portion PE2 is transposed to the value of the real part of the element R(3,5) through the element rotation, and the rotation angle thereof is dxR(4,5). Now, regardless of the first portion PE1 and the second portion PE2, all of the elements ET in the fourth column of the matrix R are rotated by the rotation angle dxR(4,5) from the real part PR thereof towards the real part PR of the left (i.e., the third column) element ET and from the imaginary part PI thereof towards the imaginary part PI of the left (i.e., the third column) element ET. Moreover, in order to maintain consistency of the matrices, all of the elements ET in the second row of the matrix P are rotated by the rotation angle dxR(4,5) from the real part PR thereof towards the real part PR of the upper (i.e., the third row) element ET and from the imaginary part PI thereof towards the imaginary part PI of the upper (i.e., the third row) element ET.

The processing method of the other elements ET in the fifth row of the second portion PE2 may refer to the above description, and all of the elements ET in the matrix R are rotated by the corresponding rotation angle from the real part PR thereof towards the real part PR of the left element ET and from the imaginary part PI thereof towards the imaginary part PI of the left element ET, and all of the elements ET in the matrix P are rotated by the corresponding rotation angle from the real part PR thereof towards the real part PR of the upper element ET and from the imaginary part PI thereof towards the imaginary part PI of the upper element ET, where a processing direction of the elements ET in the matrix R is also from right to left (taking the direction in the figure as an example), and a processing direction of the elements ET in the matrix P is also from bottom to top (taking the direction in the figure as an example). In two adjacent elements ET, when the values of the real parts PR are all 0 and the values of the imaginary parts PI are all 0, the values are not changed after the element rotation.

The element processing method of FIG. 2F to FIG. 2Q is similar to the processing method of FIG. 2B to FIG. 2E, and details thereof are not repeated. Moreover, in the present embodiment, the matrix P shown in FIG. 2Q may provide the channel state information V1, and the matrix Q shown in FIG. 2Q may provide the decoding reference matrix T. Therefore, since the matrix sizes of the matrices Q, R, P are the same, the memory space and computation complexity required for decomposing the channel matrix H are decreased.

According to the above descriptions, the channel decomposition unit 150 rotates a plurality of first complex elements ET in the first portion PE1 through the element rotation to make the first complex elements ET on the diagonal to be real numbered elements and values of other first complex elements ET to be zero, and rotates a first unit matrix (i.e., the matrix Q) column-by-column according to a plurality of rotation angles obtained through the element rotation of the first complex elements ET. Moreover, a plurality of second complex elements ET in the second portion PE2 are rotated through the element rotation to make the second complex elements ET adjacent to the diagonal to be a plurality of real numbered elements and values of the other second complex elements ET to be zero, and a second unit matrix (i.e., the matrix P) is rotated row-by-row according to a plurality of rotation angles obtained through the element rotation of the second complex elements ET to obtain the channel state information V1.

Further, the channel decomposition unit 150 transposes the imaginary part PI (i.e., a first imaginary part) of each of the first complex elements ET to the real part PR (i.e., a first real part) of each of the first complex elements ET for setting to zero through the element rotation, and transposes the real part PR of the first complex element ET to the real part PR of the adjacent first complex element ET through the element rotation for setting to zero. Moreover, the channel decomposition unit 150 transposes the imaginary part PI (i.e., a second imaginary part) of each of the second complex elements ET to the real part PR (i.e., a second real part) of each of the second complex elements ET for setting to zero through the element rotation, and transposes the real part PR of the second complex element ET to the real part PR of the adjacent second complex element ET for setting to zero through the element rotation.

In the present embodiment, when the imaginary part PI of each of the first complex elements ET is transposed to the real part PR of each of the first complex elements ET through the element rotation, the first complex elements ET and the second complex elements ET of the same row synchronously implement the above transposing operation through the element rotation. When the real part PR of each of the first complex elements ET is transposed to the real part PR of the adjacent first complex element ET through the element rotation, the first complex elements ET and the second complex elements ET of the same row synchronously implement the above transferring operation through the element rotation. When the imaginary part PI of each of the second complex elements ET is transposed to the real part PR of each of the second complex element ET through the element rotation, the first complex elements ET and the second complex elements ET of the same column synchronously implement the above transposing operation through the element rotation. When the real part PR of each of the second complex elements ET is transposed to the real part PR of the adjacent second complex element ET through the element rotation, the first complex elements ET and the second complex elements ET of the same row synchronously implement the above transposing operation through the element rotation.

Figure 3A:
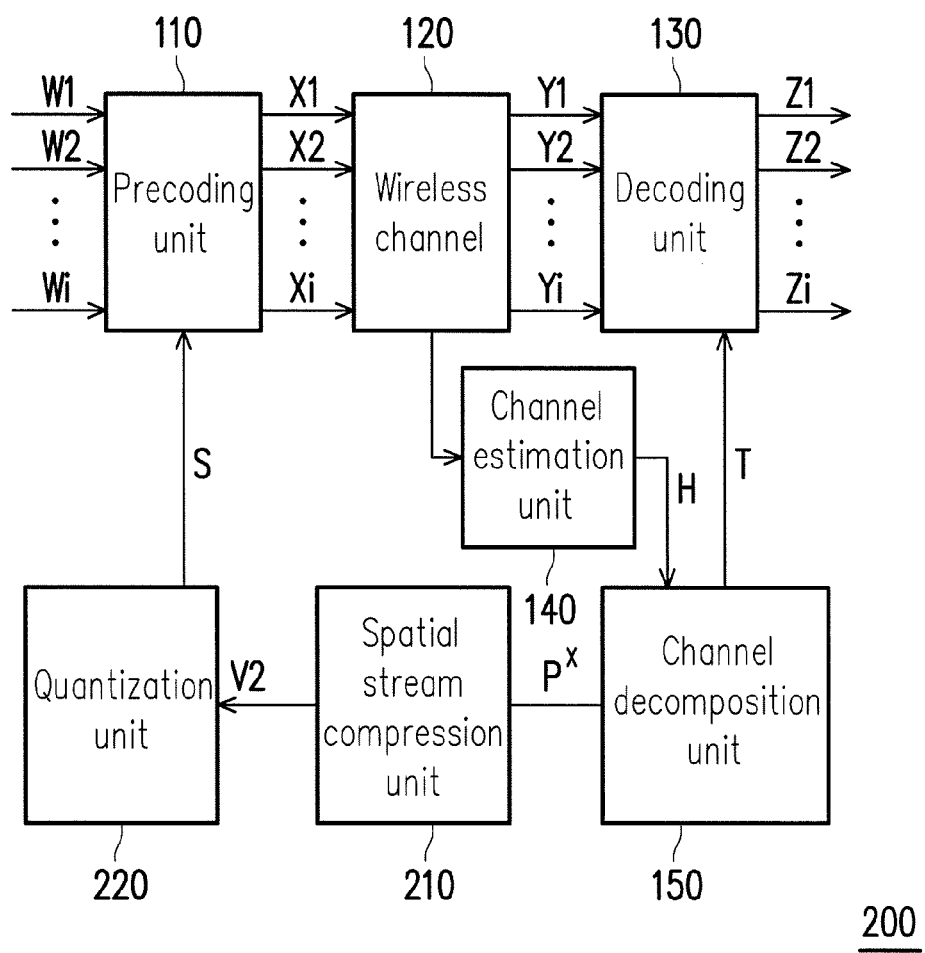
FIG. 3A is a system schematic diagram of an MIMO wireless communication system according to another embodiment of the invention.

FIG. 3A is a system schematic diagram of an MIMO wireless communication system according to another embodiment of the invention. Referring to FIG. 1 and FIG. 3A, the same or similar elements are denoted by the same or similar referential numbers. In the present embodiment, the wireless communication system 200 is substantially the same to the wireless communication system 100, and a difference therebetween is that the wireless communication system 200 further includes a spatial stream compression unit 210 and a quantization unit 220. The spatial stream compression unit 210 restores the rotated second unit matrix $P^X$ (i.e., the matrix P shown in FIG. 2Q) to a unit matrix through the element rotation, and sequentially provides rotation angles (i.e., third rotation angles) obtained during the process of restoring the second unit matrix $P^X$ to the unit matrix, so as to obtain channel state information V2, i.e., the channel state information V2 is composed of the aforementioned rotation angles.

The quantization unit 220 receives the aforementioned rotation angles, and rotates the unit matrix to the matrix $P^X$ through reverse rotation, so as to provide the wireless channel information matrix S through the matrix $P^X$. In this way, since the number of the rotation angles is smaller than the number of a value part of the whole matrix (for example, the real part and the imaginary part), return of the matrix $P^X$ can be accelerated, and delay of signal transmission is mitigated.

Figure 3B:
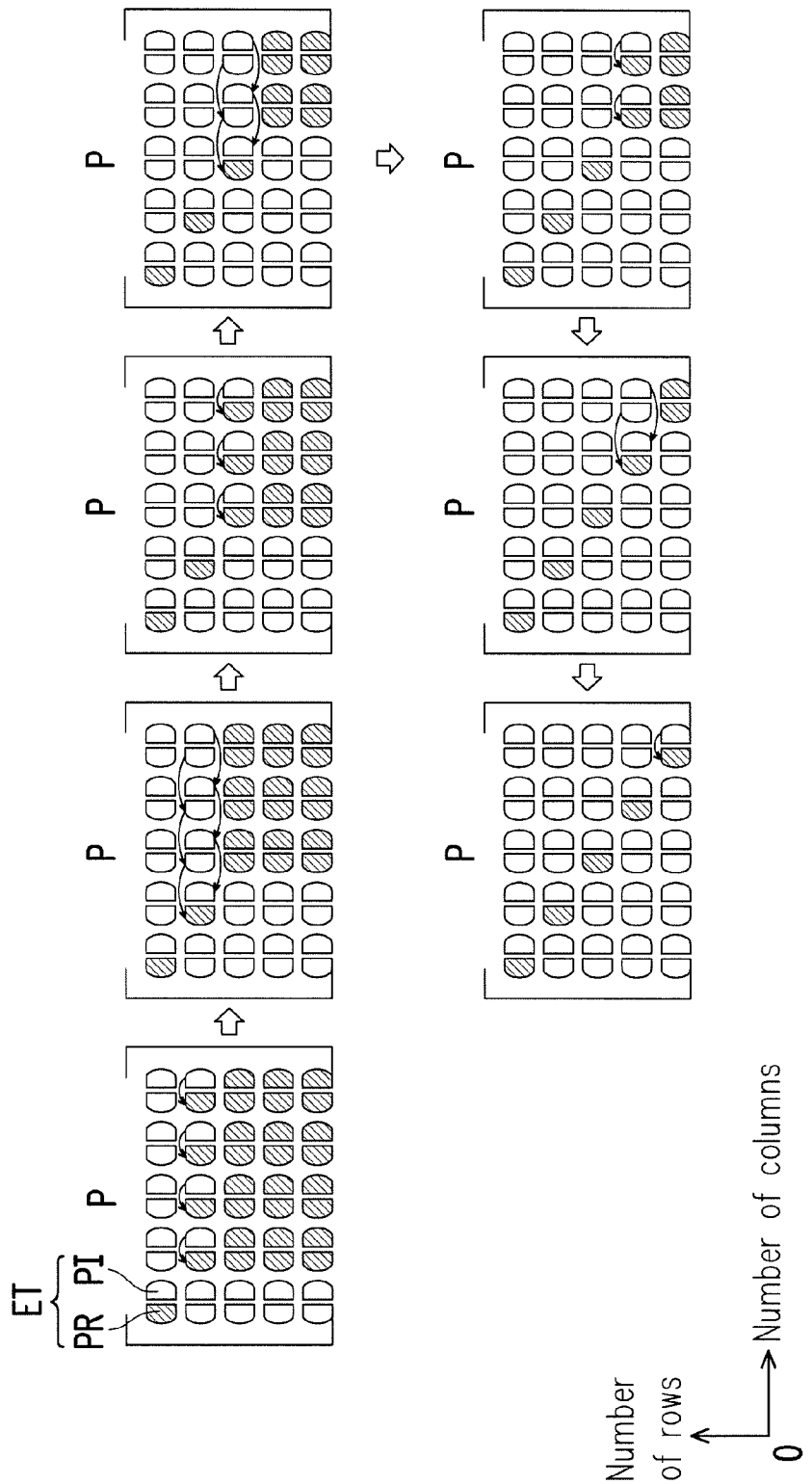
FIG. 3B is a schematic diagram of compressing a channel state matrix according to an embodiment of the invention.

FIG. 3B is a compression schematic diagram of a channel state matrix according to an embodiment of the invention. Referring to FIG. 3A and FIG. 3B, in the present embodiment, the complex elements ET of the fourth row of the matrix P are first converted into real numbered elements ET through the element rotation, i.e., the imaginary part of the complex elements ET of the fourth row are sequentially transposed to the real parts to sequentially provide rotation angles dP(5,4), dP(4,4), dP(3,4), dP(2,4), where the element rotation may refer to the embodiments of FIG. 2A to FIG. 2Q. Then, the real numbered elements ET of the fourth row in the matrix P are rotated to form a unit vector (for example, the value of the real part of the element ET of the second column and fourth row is 1, and the values of the real part PR and the imaginary part PI of the other elements ET are 0), i.e., the real parts of the real numbered elements ET of the fourth row are sequentially transposed to the real parts of the adjacent elements ET to sequentially provide rotation angles dxP(5,4), dxP(4,4), dxP(3,4).

Similarly, the complex elements ET of the third row in the matrix P are converted into the real numbered elements ET to sequentially provide rotation angles dP(5,3), dP(4,3), dP(3, 3), and the real numbered elements ET of the third row in the matrix P are rotated to form a unit vector to sequentially provide rotation angles dxP(5,3) and dxP(4,3). Then, the complex elements ET of the second row in the matrix P are converted into the real numbered elements ET to sequentially provide rotation angles dP(5,2) and dP(4,2), and the real numbered elements ET of the second row in the matrix P are rotated to form a unit vector to sequentially provide a rotation angle dxP(5,2). Finally, the complex elements ET of the first row in the matrix P are rotated to form a unit vector to sequentially provide a rotation angle dP(5,1).

In the present embodiment, since the matrix P is the complex unitary matrix, when the elements ET of each row are rotated to form a unit vector, the values (including the real part and the imaginary part) of the other elements ET in the row where the element ET having a value is located in the unit vector is rotated to the adjacent element ET for setting to zero.

Moreover, since decomposition of the channel matrix H and restoring of the matrix $P^X$ to the unit matrix are implemented through the element rotation, a part of hardware (for example, CORDIC) can be shared, and hardware cost and power consumption are not greatly increased.

Figure 4:
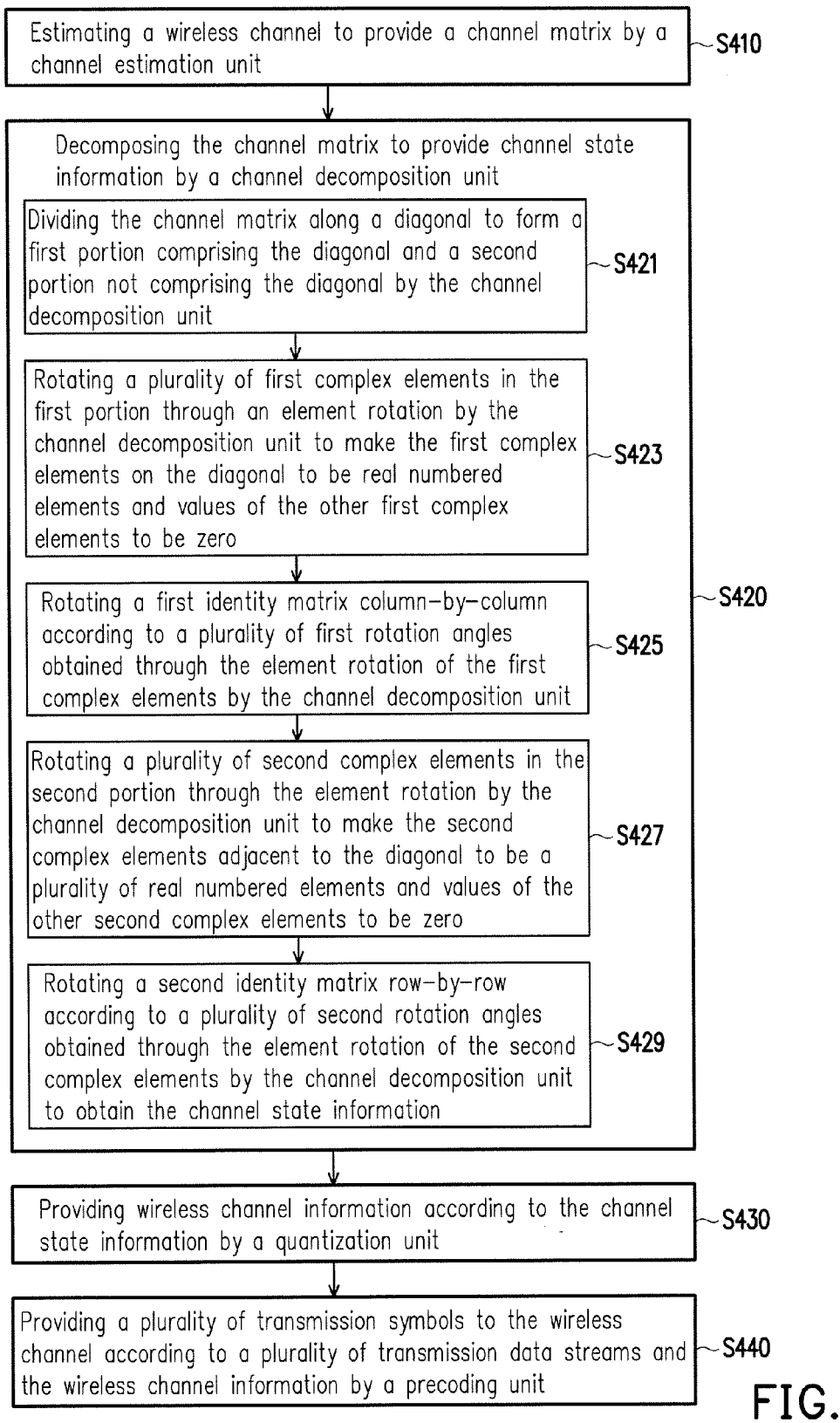
FIG. 4 is a flowchart illustrating a channel decomposition method of an MIMO wireless communication system according to an embodiment of the invention.

FIG. 4 is a flowchart illustrating a channel decomposition method of an MIMO wireless communication system according to an embodiment of the invention. Referring to FIG. 4, in the present embodiment, the channel decomposition method includes at least following steps. First, estimating a wireless channel to provide a channel matrix by a channel estimation unit (step S410), and decomposing the channel matrix to provide channel state information by a channel decomposition unit (step S420). Then, providing wireless channel information according to the channel state information by a quantization unit (step S430), and providing a plurality of transmission symbols to the wireless channel by a precoding unit according to a plurality of transmission data streams and the wireless channel information (step S440).

Moreover, the step S420 includes following steps. Dividing the channel matrix along a diagonal to form a first portion including the diagonal and a second portion not including the diagonal by the channel decomposition unit (step S421). Rotating a plurality of first complex elements in the first portion through an element rotation by the channel decomposition unit to make the first complex elements on the diagonal to be real numbered elements and values of the other first complex elements to be zero (step S423). Rotating a first unit matrix column-by-column according to a plurality of first rotation angles obtained through the element rotation of the first complex elements by the channel decomposition unit (step S425). Rotating a plurality of second complex elements in the second portion through the element rotation by the channel decomposition unit to make the second complex elements adjacent to the diagonal to be a plurality of real number elements and values of the other second complex elements to be zero (step S427), and Rotating a second unit matrix row-by-row according to a plurality of second rotation angles obtained through the element rotation of the second complex elements by the channel decomposition unit to obtain the channel state information (step S429). Details of the aforementioned steps S410, S420, S421, S423, S425, S427, S429, S430, S440 may refer to the embodiments of FIG. 1, FIG. 2A to FIG. 2Q, FIG. 3A and FIG. 3B, which are not repeated.

In summary, in the multiple input multiple output wireless communication system and the channel decomposition method thereof of the invention, the channel matrix is directly decomposed into three matrices through the element rotation, and matrix sizes of the three matrices are the same to that of the channel matrix. In this way, a memory space and the computation complexity required for decomposing the channel matrix are decreased. Moreover, the matrix corresponding to the channel state information can be compressed through the element rotation, so as to mitigate delay of signal transmission. In addition, the matrix processing (for example, matrix conversion, matrix decomposition) of the invention is implemented through the element rotation, such that a part of the hardware (for example, the CORDIC) can be shared, and hardware cost is not greatly increased.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A multiple input multiple output wireless communication system, comprising:
   a precoding unit, receiving a plurality of transmission data streams and quantized wireless channel information to provide a plurality of transmission symbols to a wireless channel;
   a channel estimation unit, estimating the wireless channel to provide a channel matrix;
   a channel decomposition unit, decomposing the channel matrix to provide channel state information, wherein the channel decomposition unit divides the channel matrix along a diagonal to form a first portion comprising the diagonal and a second portion not comprising the diagonal, and rotates a plurality of first complex elements in the first portion through an element rotation to make the first complex elements on the diagonal to be real numbered elements and values of the other first complex elements to be zero, and rotates a first unit matrix column-by-column according to a plurality of first rotation angles obtained through the element rotation of the first complex elements, and rotates a plurality of second complex elements in the second portion through the element rotation to make the second complex elements adjacent to the diagonal to be a plurality of real numbered elements and values of the other second complex elements to be zero, and rotates a second unit matrix row-by-row according to a plurality of second rotation angles obtained through the element rotation of the second complex elements to obtain the channel state information; and
   a quantization unit, providing the wireless channel information according to the cannel state information.

2. The multiple input multiple output wireless communication system as claimed in claim 1, wherein the channel decomposition unit transposes a first imaginary part of each of the first complex elements to a first real part of each of the first complex elements for setting to zero through the element rotation, and transposes the first real part of each of the first complex elements to the first real part of the adjacent first complex element for setting to zero through the element rotation, and the channel decomposition unit transposes a second imaginary part of each of the second complex elements to a second real part of each of the second complex elements for setting to zero through the element rotation, and transposes the second real part of each of the second complex elements to the second real part of the adjacent second complex element for setting to zero through the element rotation.

3. The multiple input multiple output wireless communication system as claimed in claim 1, further comprising a spatial stream compression unit, restoring the rotated second unit matrix to a unit matrix through the element rotation to obtain the channel state information, wherein the channel state information is composed of a plurality of third rotation angles.

4. The multiple input multiple output wireless communication system as claimed in claim 1, wherein matrix sizes of the first unit matrix and the second unit matrix are the same to a matrix size of the channel matrix.

5. The multiple input multiple output wireless communication system as claimed in claim 1, wherein the first rotation angles and the second rotation angles are calculated by a coordinate rotation digital computer (CORDIC).

6. The multiple input multiple output wireless communication system as claimed in claim 1, wherein the element rotation is a Givens rotation.

7. A channel decomposition method of a multiple input multiple output wireless communication system, comprising:
   estimating a wireless channel to provide a channel matrix by a channel estimation;
   decomposing the channel matrix to provide channel state information by a channel decomposition, comprising:
      dividing the channel matrix along a diagonal to form a first portion comprising the diagonal and a second portion not comprising the diagonal by the channel decomposition unit;
      rotating a plurality of first complex elements in the first portion through an element rotation by the channel decomposition unit to make the first complex elements on the diagonal to be real numbered elements and values of the other first complex elements to be zero;
      rotating a first unit matrix column-by-column according to a plurality of first rotation angles obtained through the element rotation of the first complex elements by the channel decomposition unit;
      rotating a plurality of second complex elements in the second portion through the element rotation by the channel decomposition unit to make the second complex elements adjacent to the diagonal to be a plurality of real numbered elements and values of the other second complex elements to be zero; and
      rotating a second unit matrix row-by-row according to a plurality of second rotation angles obtained through the element rotation of the second complex elements by the channel decomposition unit to obtain the channel state information;
   providing wireless channel information according to the channel state information by a quantization unit; and
   providing a plurality of transmission symbols to the wireless channel according to a plurality of transmission data streams and the wireless channel information by a precoding unit.

8. The channel decomposition method of the multiple input multiple output wireless communication system as claimed in claim 7, wherein the step of decomposing the channel matrix to provide the channel state information by the channel decomposition unit comprises:
   transposing a first imaginary part of each of the first complex elements to a first real part of each of the first complex elements for setting to zero through the element rotation by the channel decomposition unit, and transposing the first real part of each of the first complex elements to the first real part of the adjacent first complex element for setting to zero through the element rotation by the channel decomposition unit; and
   transposing a second imaginary part of each of the second complex elements to a second real part of each of the second complex elements for setting to zero through the element rotation by the channel decomposition unit, and transposing the second real part of each of the second complex elements to the second real part of the adjacent second complex element for setting to zero through the element rotation by the channel decomposition unit.

9. The channel decomposition method of the multiple input multiple output wireless communication system as claimed in claim 7, wherein the multiple input multiple output wireless communication system further comprises a spatial stream compression unit for restoring the rotated second unit matrix to a unit matrix through the element rotation to obtain the channel state information, wherein the channel state information is composed of a plurality of third rotation angles.

10. The channel decomposition method of the multiple input multiple output wireless communication system as claimed in claim 7, wherein matrix sizes of the first unit matrix and the second unit matrix are the same to a matrix size of the channel matrix.

11. The channel decomposition method of the multiple input multiple output wireless communication system as claimed in claim 7, wherein the first rotation angles and the second rotation angles are calculated by a coordinate rotation digital computer (CORDIC).

12. The channel decomposition method of the multiple input multiple output wireless communication system as claimed in claim 7, wherein the element rotation is a Givens rotation.

* * * * *